United States Patent
Leng et al.

(10) Patent No.: US 12,000,707 B2
(45) Date of Patent: Jun. 4, 2024

(54) COMMUNICATIONS SERVER APPARATUS AND METHODS OF OPERATION THEREOF

(71) Applicant: GRABTAXI HOLDINGS PTE. LTD., Singapore (SG)

(72) Inventors: Mei Leng, Singapore (SG); Jagannadan Varadarajan, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 17/914,795

(22) PCT Filed: Apr. 28, 2020

(86) PCT No.: PCT/SG2020/050257
§ 371 (c)(1),
(2) Date: Sep. 27, 2022

(87) PCT Pub. No.: WO2021/221561
PCT Pub. Date: Nov. 4, 2021

(65) Prior Publication Data
US 2023/0118037 A1    Apr. 20, 2023

(51) Int. Cl.
G01C 21/34      (2006.01)
G01C 21/00      (2006.01)
G06F 16/29      (2019.01)

(52) U.S. Cl.
CPC ....... *G01C 21/343* (2013.01); *G01C 21/3841* (2020.08); *G06F 16/29* (2019.01)

(58) Field of Classification Search
CPC .... G01C 21/343; G01C 21/3841; G06F 16/29
See application file for complete search history.

(56) References Cited

U.S. PATENT DOCUMENTS 8,320,939 B1    11/2012    Vincent
2006/0004514 A1    1/2006    Bennett et al.
(Continued)

FOREIGN PATENT DOCUMENTS

CN    104422454    3/2015
CN    105628040    6/2016
(Continued)

OTHER PUBLICATIONS

Written Opinion for Application No. PCT/SG2020/050257, dated Sep. 29, 2020, (7 pages).
(Continued)

*Primary Examiner* — Rami Khatib
*Assistant Examiner* — Gabriel Joseph Rene Lambert
(74) *Attorney, Agent, or Firm* — Buckley, Maschoff & Talwalkar LLC

(57) ABSTRACT

Communications server apparatus (102) for generating navigable map data comprises a processor (116) and a memory (118), and is configured, under control of the processor, to execute instructions (120) stored in the memory: to generate a series (340) of journey trace data sets (338), each journey trace data set comprising data representing a user journey (310), each journey trace data set being derived using geolocation transmissions (318) from a communications device (104, 106) of a user (308) undertaking the user journey; to aggregate the series of journey trace data sets to generate route image data comprising data representing a network of navigable routes; and to generate, from the route image data, the navigable map data, the navigable map data comprising data representing a series of geolocations corresponding to the network of navigable routes.

18 Claims, 14 Drawing Sheets

(56) References Cited

U.S. PATENT DOCUMENTS

| | | | |
|---|---|---|---|
| 2010/0021013 A1 | 1/2010 | Gale et al. | |
| 2010/0131184 A1 | 5/2010 | Stanton | |
| 2010/0305850 A1* | 12/2010 | Krumm | G01C 21/3844 |
| | | | 701/532 |
| 2012/0019411 A1* | 1/2012 | Trautenberg | G01S 19/41 |
| | | | 342/357.24 |
| 2013/0066548 A1* | 3/2013 | Gruen | G01C 21/3617 |
| | | | 701/410 |
| 2014/0108137 A1 | 4/2014 | Kuri et al. | |
| 2014/0172291 A1* | 6/2014 | Lookingbill | G08G 1/0112 |
| | | | 701/409 |
| 2016/0146609 A1 | 5/2016 | Ma et al. | |
| 2017/0115403 A1* | 4/2017 | Moura | G01S 5/0278 |
| 2017/0176193 A1 | 6/2017 | Chau et al. | |
| 2017/0337305 A1 | 11/2017 | Wilson et al. | |
| 2017/0343375 A1 | 11/2017 | Kamhi et al. | |
| 2018/0066957 A1* | 3/2018 | Stroila | G01C 21/3841 |
| 2018/0245927 A1 | 8/2018 | Frish et al. | |
| 2019/0064347 A1* | 2/2019 | Jones | G01S 13/95 |
| 2019/0129040 A1* | 5/2019 | He | G01S 19/21 |
| 2019/0215660 A1 | 7/2019 | Slushtz et al. | |
| 2020/0103237 A1* | 4/2020 | Ma | G08G 1/0112 |
| 2020/0107163 A1* | 4/2020 | Li | G06Q 10/04 |
| 2021/0165107 A1* | 6/2021 | Regikumar | G01S 19/393 |
| 2021/0165410 A1* | 6/2021 | Liang | G01C 21/36 |
| 2021/0318125 A1* | 10/2021 | Ahmed | G01C 21/3407 |

FOREIGN PATENT DOCUMENTS

| | | |
|---|---|---|
| CN | 108709557 | 10/2018 |
| CN | 110174106 | 8/2019 |
| CN | 110472000 | 11/2019 |
| JP | 2018-128306 | 8/2018 |
| KR | 2017-0142235 | 12/2017 |
| WO | WO-2016/153426 | 9/2016 |

OTHER PUBLICATIONS

Karimi et al., "Pedestrian network map generation approaches and recommendation", International Journal of Geographical Information Science, vol. 27, 2013, Issue 5, (4 pages).

International Search Report for Application No. PCT/SG2020/050257, dated Sep. 29, 2020.

Biagioni et al., "Inferring Road Maps from Global Positioning System Traces", Survey and Comparative Evaluation, Transportation Research Record 2291, pp. 61-71.

Blanke et al. "Crowdsourced Pedestrian Map Construction for Short-Term City-Scale Events", pp. 25-31.

International Preliminary Report for Application No. PCT/SG2020/050257, dated Jan. 25, 2022, (17 pages).

* cited by examiner

COMMUNICATIONS SERVER APPARATUS AND METHODS OF OPERATION THEREOF

TECHNICAL FIELD

The invention relates generally to the field of communications. One aspect of the invention relates to a communications server apparatus for generating navigable map data. Another aspect of the invention relates to a method, performed in a communications server apparatus for generating navigable map data. Other aspects of the invention relate to a computer program product or a computer program comprising instructions for implementing a method of generating navigable map data. Another aspect of the invention relates to a non-transitory storage medium storing instructions, which when executed by a processor, cause the processor to perform a method of generating navigable map data.

One aspect of the invention has particular, but not exclusive, application in the generation of maps which are navigable by pedestrians. This allows for navigable maps to be built using crowd sourced satellite navigation measurements from user communication devices, like mobile smartphones.

BACKGROUND

Accurate and complete road maps play an important role in navigation and localisation applications. With the emergence of autonomous driving and ride-hailing, extensive efforts have been devoted to improving existing road networks by correcting errors and updating new roads. With the popularity of satellite navigation devices such as car global navigation satellite system (GNSS) receivers, including hardware and software components providing this functionality in user communications devices like smartphones, automatic map inference using crowdsourcing satnav measurements has attracted interest, as it may enable map generation with high efficiency, high accuracy and low labour cost. With decades of development in both academia and industrial communities, automatic map inference development still however faces significant challenges due to satnav noise and low sampling rate for devices like smartphones, and it almost solely focused on vehicle road networks as which the availability and quality of satnav traces from in-car satnav systems is much higher.

It is clear that nowadays mobile users spend an increasing proportion of their time indoors; for example, passengers using ride-hailing apps need to be navigated to the meeting place with the driver, the pickup point, and delivery personnel (e.g. food, packages) need to be navigated to the correct pick up points (e.g. restaurants, office). Therefore, pedestrian walkable maps may be useful in such applications, but unfortunately, very few solutions have been developed for this problem.

Most existing techniques are for vehicle networks using GPS pings from moving vehicles. In such cases, GPS signals are more accurate and use of with high accuracy. The earliest work in academia uses k-means techniques to cluster nearby pings in satnav traces [1, 2, 3, 4], and another group of research work adopts trace merge by identifying and clustering nearby traces [5, 6, 7]. Both groups of work are suitable for high quality satnav measurements, which present clear and sufficiently dense traces. Another group of work applies kernel density estimation (KDE) to convert satnav measurements into density images and extract roads as the centreline of the most condensed area [8, 9, 10]. The KDE method could be considered to handle satnav noise better but still requires the existence of a clear road separation. A more recent method [12, 13] proposes first to identify road intersections and then infer the road by connecting intersections. Such methods are only applicable to maps like road network with strict line constraints.

A list of known academic literature on map inference from satnav probe data is listed in the references section. There are works related to pedestrian satnav [14, 15, 16], but none of them aim to build a complete map like a complete walkable map for pedestrians. [14, 15] are essentially based on the trace merge algorithm, and [16] only identify hot spots on the map.

While inferring motorable roads and pedestrian paths fall under the broad category of map inference using GPS, the inference of pedestrian walkable map has distinct differences from that of vehicle road network.

1. Crowdsourcing satnav measurements from pedestrian mobile phones—such as those taken from a location-sensitive apps resident on the phone and then transmitted over a network to the app service provider's back end—have lower accuracy and lower sampling rates than those from car satnav devices. Clear traces are not hence readily available from such low-quality pings, which is however one of the most important assumptions for both k-means and trace merging methods. It can be shown that even the lower-quality satnav measurements from existing work exhibits relatively clear traces, while a major amount of pedestrian satnav measurements show scattering. Existing algorithms based on KDE are designed to be noise robust, but it requires very dense sampling points so that the density estimation can achieve good performance, which makes it not directly suitable for applications which might wish to make user of such crowd sourced satnav measurements.
2. Pedestrians tend to walk randomly and take shortcuts, especially in open areas, and hence road restrictions that are normally useful in vehicle road networks cannot be easily applied. The most recent algorithms using road intersection cannot be used.

SUMMARY

Aspects of the invention are as set out in the independent claims. Some optional features are defined in the dependent claims.

Implementation of the techniques disclosed herein may provide significant technical advantages. For instance, the techniques may facilitate generation of navigable map data from low-quality geolocation measurements as typical generated from user communication devices such as mobile telephones.

The techniques follow a three-step framework, each of which may be provided independently, to convert scattered low-quality geolocation transmissions into a routable map which may be used by, for example, pedestrians or road traffic users. Stated at high-level, these techniques allow for generation of journey trace datasets derived from geolocation/satnav measurements in the users' mobile telephones, with the techniques being robust against noise, transforming low-quality measurements into usable traces with properties similar to higher-quality in-vehicle satnav equipment. Then, these techniques allow extraction of navigable routes from the journey trace datasets, thus further reducing noise and merging plural journey traces along the same route. Then, the navigable routes are converted into navigable map data.

The techniques take advantage of the knowledge of the starting and destination locations for user journeys. The techniques may implement a weighted the shortest path determination between two such points, leading to efficient and accurate route finding and removing the necessity of, for example, pruning as in existing map inference techniques.

Key aspects of the described innovations include the integration of the merits of KDE-based algorithm and trace merge algorithm and proposes a three-step framework which is robust against noise and with high inference accuracy. The techniques explore the information of the start point and destination point of user, for example pedestrian, trips to extract walking traces of high quality. This extra information helps us to resolve the issue of sparse data such that a clear trace can be extracted even when only a handful of GPS pings are available.

BRIEF DESCRIPTION OF THE DRAWINGS

The invention will now be described, by way of example only, and with reference to the accompanying drawings in which.

DETAILED DESCRIPTION

Unless stated otherwise, terms such as "first" and "second", where used, are used to distinguish between the elements such terms describe. Thus, these terms are not necessarily intended to indicate temporal or other prioritisation of such elements.

Exemplary Definitions

One trip: A sequence of raw geolocation transmissions collected from one user in a particular trip from one location to another.

One journey trace: A sequence of location points from one location A to another location B; the trace is typically smooth and consisting of geolocation transmissions at location points from either one user trip or multiple trips from A to B. Two journey traces can overlap completely.

One navigable route: A sequence of geolocation points from one location A to another location B; the route may be smooth and consist of points derived from multiple walking traces. It is preferred that two navigable routes do not completely overlap.

A navigable map: A routable map consisting of multiple navigable routes. A straight path is represented by a straight line with two end nodes, and a curved path is composed of multiple connected straight lines. Routing can be achieved by connecting points and lines between any two geolocation points on the map.

Figure 1:
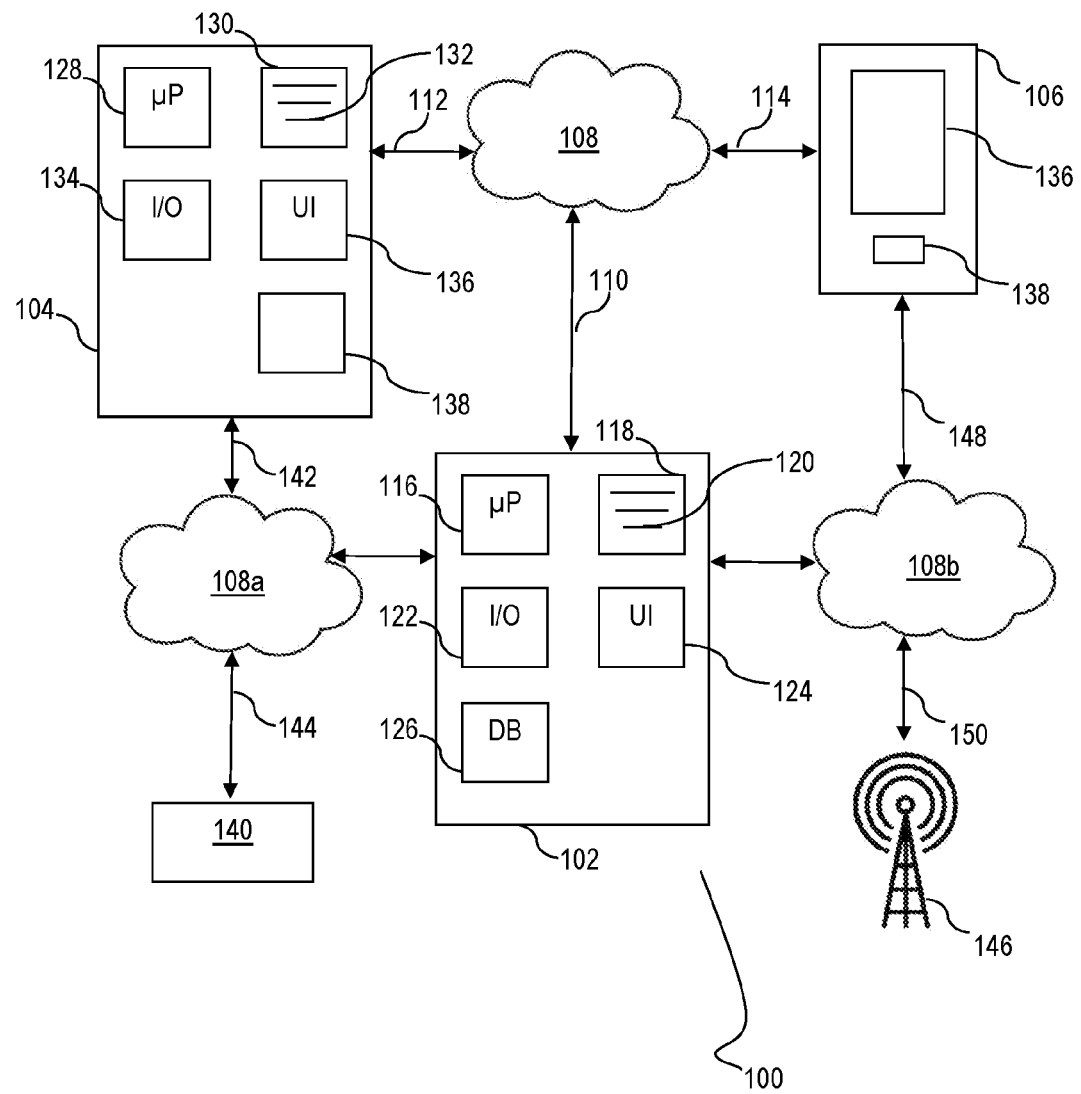
FIG. 1 is a schematic block diagram illustrating a first exemplary communications system, in particular a communications server apparatus for generating navigable map data.

Referring initially to FIG. 1, a communications system 100 is illustrated. Communications system 100 comprises communications server apparatus 102, user communications device 104 and user communications device 106. These devices are connected in the communications network 108 (for example the Internet) through respective communications links 110, 112, 114 implementing, for example, internet communications protocols. Communications devices 104, 106 may be able to communicate through other communications networks, such as a global navigation satellite system (GNSS) network 108a, and public switched telephone networks (PSTN networks), such as cellular communications network 108b.

Communications server apparatus 102 may be a single server as illustrated schematically in FIG. 1, or have the functionality performed by the server apparatus 102 distributed across multiple server components. In the example of FIG. 1, communications server apparatus 102 may comprise a number of individual components including, but not limited to, one or more microprocessors 116, a memory 118 (e.g. a volatile memory such as a RAM) for the loading of executable instructions 120, the executable instructions defining the functionality the server apparatus 102 carries out under control of the processor 116. Communications server apparatus 102 also comprises an input/output module 122 allowing the server to communicate over the communications networks 108, 108a, 108b. User interface 124 is provided for user control and may comprise, for example, computing peripheral devices such as display monitors, computer keyboards and the like. Server apparatus 102 also comprises a database 126, the purpose of which will become readily apparent from the following discussion.

User communications device 104 may comprise a number of individual components including, but not limited to, one or more microprocessors 128, a memory 130 (e.g. a volatile memory such as a RAM) for the loading of executable instructions 132, the executable instructions defining the functionality the user communications device 104 carries out under control of the processor 128. User communications device 104 also comprises an input/output module 134 allowing the user communications device 104 to communicate over the communications network 108. User interface 136 is provided for user control. If the user communications device 104 is, say, a smart phone or tablet device, the user interface 136 will have a touch panel display as is prevalent in many smart phone and other handheld devices. User communications device 104 also comprises satnav components 138, which allow user communications device to conduct a measurement or at least approximate the geolocation of user communications device 104 by receiving timing signals from GSSN satellites 140 through GSSN network 108a using communications channels 142, 144 as is known.

User communications device 106 may be, for example, a smart phone or tablet device with the same or a similar hardware architecture to that of user communications device 104. User communications device 106, has, amongst other things, user interface 136 in the form of a touchscreen display and satnav components 138. User communications device 106 is able to communicate with cellular network base stations 146 through cellular telecommunications network 108b using channels 148, 150. User communications device 106 is able to approximate is geolocation by receiving timing signals from the cellular network base stations 146 through cellular telecommunications network 108b as is known. Of course, user communications device 104 may also be able to approximate its geolocation by receiving timing signals from the cellular network base stations 146 and user communications device 106 may be able to approximate its geolocation by receiving timing signals from the GSSN satellites 140, but these arrangements are omitted from FIG. 1 for the sake of simplicity.

Figure 2:
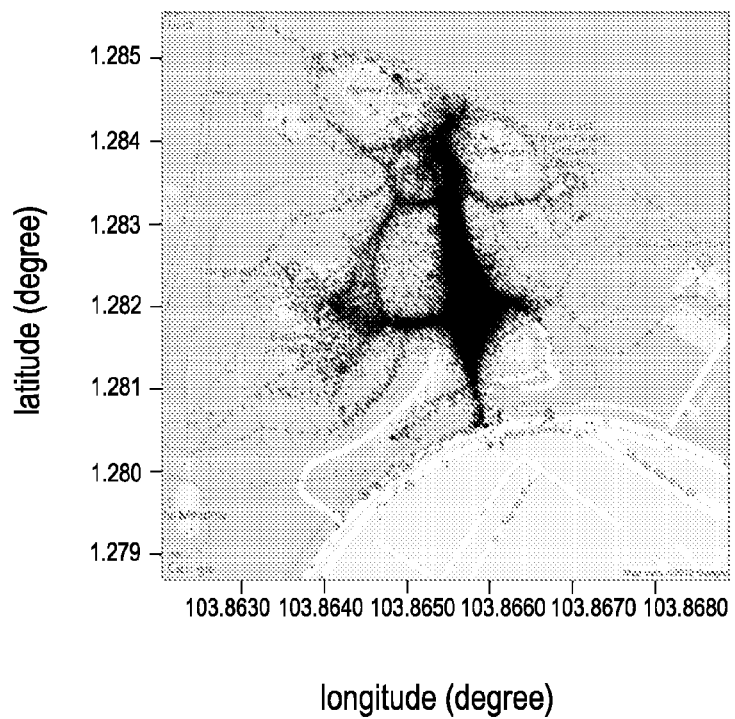
FIG. 2 is a screenshot illustrating crowd sourced satellite navigation transmissions from users' mobile communications devices.

FIG. 2 provides an illustration of a pattern of crowd-sourced satnav geolocation measurements as measured by the users' mobile phones and interfacing with satnav components 138 and then transmitted to communications server apparatus 102. In this example, the transmissions of the geolocation measurements have been generated from ride-hailing apps resident on users' mobile phones while they are using the app, for instance while making a booking for a vehicle to pick them up. The geolocation transmissions are transmitted by the users' mobile phone apps as the users journey from the geographic locations at which they had been located at the time they made the bookings to a rendezvous point with the driver, the "pickup point" from which the driver will drive them to their ultimate destinations. Such geolocation measurements determined in mobile phones and transmitted by the ride-hailing apps are, as noted above, typically of low-precision, with the "ping" period typically being set at around one minute. So, data from each user is sparse and often not particularly accurate. However, and as can be seen, and as noted above, even the "low" quality satnav measurements and transmissions exhibit relatively clear traces. The techniques presented herein provide a novel framework which may be able to produce a high-quality navigable map to handle noisy and sparse pedestrian geolocation transmissions. Such a navigable map could be utilised in any pedestrian journey to provide the user with reliable walking directions within the area. And while the techniques disclosed herein have particular application for the production of navigable pedestrian maps, they also have wider application in the generation of navigable roadmaps produced from geolocation transmissions from, for example, in-vehicle satnav equipment.

Typical application scenarios include indoor navigation, such as in shopping malls, airports and the like, or partially indoor-outdoor journeys as are commonly required at tourist attractions. The techniques are particularly suitable for single-level mapping, both indoor and outdoor. The example of FIG. 2 is in an almost wholly outdoors context, at a garden attraction.

The techniques disclosed herein propose a framework in which three steps—each of which may be provided individually—combine for the generation of navigable map data using geolocation transmissions from the communications device of users (these may be pedestrians undertaking walking journeys). The techniques are robust in view of the inherent low-quality in the transmitted geolocation measurements ("pings") from the users' mobile phones and with high inference accuracy. Amongst others, the techniques may integrate the merits of kernel density estimation (KDE) and a trace merge algorithm. The techniques explore the information of the starting point and destination point of users' trips to extract journey traces of high quality. The extra information facilitates the resolution of the issue of sparse data such that the clear journey trace data sets may be extracted even when only a handful of geolocation measurements/transmissions are available.

In the following discussion, FIGS. 2-6 should be viewed in conjunction with one another. Looking first at FIG. 3a, this depicts a geographical area divided into a group 300 of geographical cells 302. In one implementation, the geographical cells 302 are defined according to geohash standards and may be, for example, defined in terms of precision level, for example at geohash 8 (defining an area of 38.2 m×19 m) or geohash 9 (defining an area of 4.8 m×4.8 m), or another precision level which may be desired.

These geographical cells 302 have precisely-defined (e.g. by latitude and longitude) location points within them, for example location 304 is defined as the centre point of one of the cells 302a and locations 306 are defined as non-centre points of another of the cells 302b.

Figure 3A:
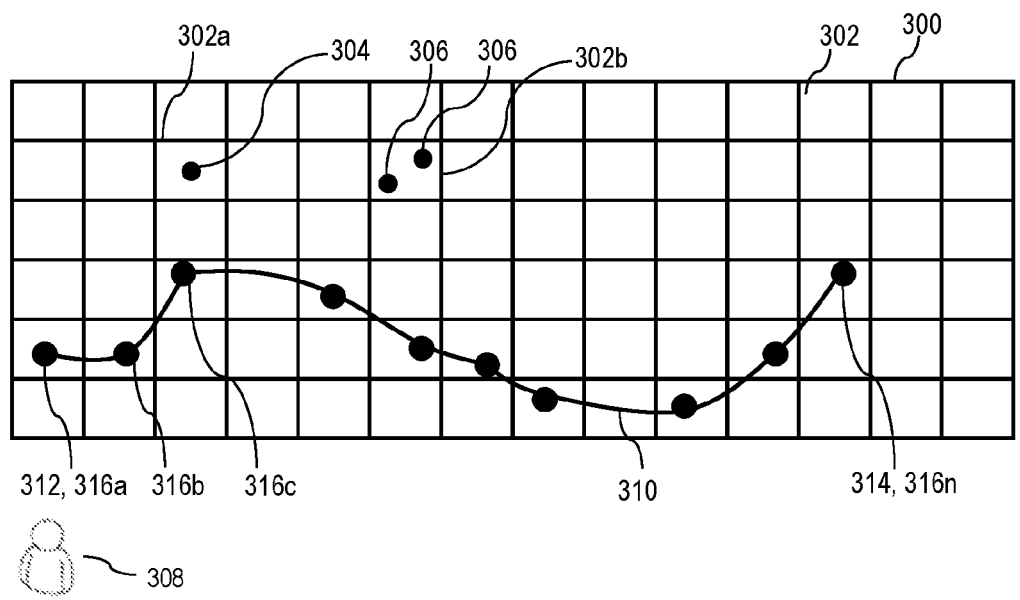
FIGS. 3A, 3B, 3C, 3D, 3E and 3F are a series of schematic diagrams illustrating one technique used by the communications server apparatus of FIG. 1 in generating journey trace data sets.

A user/traveller 308 is shown about to commence a user journey depicted by the line 310 in FIG. 3a from journey start point 312 to journey end point 314. In one example of such a journey, user 308 is at location 312 and, using a ride-hailing app resident on the user communications device (such as user communications device 104 or 106 from FIG. 1) the user has arranged to be picked up by a car (not shown) at location 314. While traversing the route 310 by walking, the mobile communications device 104, 106 of user 308 transmits, to communications server apparatus 102, geolocation measurements as determined using satnav components 138 at locations 316a, 316b, 316 . . . 316n. In the example given, the initial geolocation transmission location 316a coincides with journey start location 312 and geolocation transmission location 316n coincides with journey end location 314.

Figure 3B:
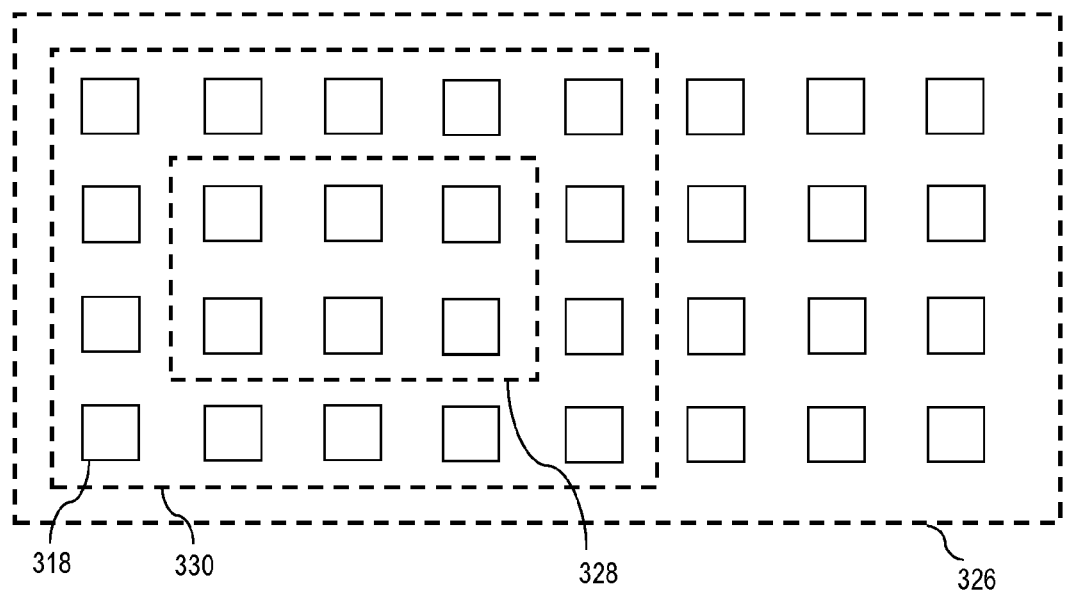
Figure 3C:
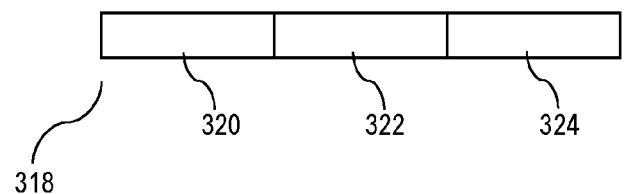

The geolocation transmissions 318 are shown schematically in FIG. 3b. The boxes 318 represent data encoded in transmissions transmitted by the user communications device 104, 106 to the communications server apparatus 102. Communications server apparatus 102 receives the geolocation transmissions 318, storing them in database 126, or other storage. Communications server apparatus 102 forms an overall group 326 of all geolocation transmissions 318 from all user communication devices 104, 106 in the group 300 of geographical cells. Referring to FIG. 3c, each geolocation transmission 318 comprises at least first data field 324 defining a value representing the latitude of the user communication device at the time the geolocation transmission was transmitted, second data field 322 defining a value representing the longitude of the user communication device at the time the geolocation transmission was transmitted and third data field 324 defining a value representing the precision of the geolocation measurement as derived by the user communication device. In the situation where the GNSS system is the Global Positioning System (GPS), the geolocation transmissions are sometimes referred to as "GPS pings", and the data field 324 of the GPS ping is a measurement of the GPS quality index, an indicator of the accuracy of the GPS measurement.

It will be appreciated that journey/journey trace 310 may be just one of multiple journeys that multiple users undertake in the group 300 of geographical cells, although these other journeys are omitted from FIG. 3 for the sake of clarity. Further, at least some of these multiple journeys may end at the same journey end location 314, particularly if journey end location 314 is somewhere like a designated pickup/drop off point at or near a public place, such as an entrance to a shopping mall, an office block, a tourist attraction and so on. And of course, some of these multiple journeys may also commence from the same starting location 312, or at least from the same cell 302 that starting location 312 is located within.

In the example of FIG. 3, communications server apparatus 102 forms a first group 328 of geolocation transmissions 318 and, optionally (as described below), a second group 330. First group 328 defines geolocation transmissions 318 transmitted by a particular user, or at least is a grouping of geolocation transmissions estimated to have been transmitted by a particular user. This grouping can be done in a number of ways, but in the example of FIG. 3, communications server apparatus 102 identifies geolocation transmissions from journeys/journey traces which have a common starting location 312 and a common destination location 314, where these locations can be pinpointed as precise locations such as a centre location 304 of a cell or a non-centre location 306 or defined as wider geographical areas, such as one of the geographical cells 302, or a mixture of both. For instance, it may be that common starting location 312 is defined broadly as being any location within a particular cell 302 and the destination location 314 is a specific location point, defined by a latitude and a longitude. In this implementation, grouping by destination is a useful way of collecting data. In an alternative implementation, it is possible to do the initial grouping based on starting location.

It will be recalled from above that term such as "first" and "second" with respect to groups 328, 330 are not necessarily intended to indicate temporal or other prioritisation of the elements. The labelling of the groups thus is not to suggest that the first group is formed prior to the second group. Indeed, in the current example and as best viewed with reference to FIG. 6 (illustrating the steps of a process 600 which may be used in the generation of journey trace datasets), after the process starts at 602, communications server apparatus 102 forms, at step 604, second group 330 of geolocation transmissions 318 from journey traces having a common destination location 314. In a preferred arrangement, the common destination location is a precise location, defined by a latitude and a longitude. At step 606, communications server apparatus 102 forms first group 328 of geolocation transmissions 318 within second group 330, where the geolocation transmissions in the first group 328 also have a common starting location 312. In a preferred arrangement, the common starting location is a geographical cell 302, as can be defined using, for example, the geohash protocols/definitions. But it will also be appreciated that, in an alternative arrangement, communications server apparatus 102 forms first group 328 of geolocation transmissions 318 having a common starting location and the common destination location without a specific step of forming the second group 330.

Thus, in this example of FIGS. 3-6, first group 328 of geolocation transmissions 318 defines a subset of second group 330 of geolocation transmissions 318, and second group 330 forms a subset of overall group 326 of geolocation transmissions from all users (e.g. in the group 300 of geographical cells 302). Or, to put it another way, communications server apparatus 102 is configured for the first group 328 of geolocation transmissions 318 to be formed from a second group 330 of geolocation transmissions 318 from journey traces 310 having the common destination location 314, but different starting locations 312. As noted above, for the communications server apparatus 102 to group the geolocation transmissions 318 in this way, this can be considered a good approximation of capturing geolocation transmissions from the same user. Other techniques can also be used either separately or in conjunction with this grouping, for example detecting a unique identifier (not shown) transmitted in or with the geolocation transmission 318 is a useful technique. Typical unique identifiers include something identifying the user of the (for example) ridehailing app resident on the user's communication device, such as a login username for the app, or other such means, like the international mobile equipment identity (IMEI) of the user's communication device. It may not be necessary actually to identify the user or the user's communications device 104, 106; it may be sufficient to determine or estimate/approximate which of the geolocation transmissions 318 are transmitted by a particular device, without specifically having to identify the device itself or the device user.

It will therefore be appreciated that communications server apparatus 102 generates a journey trace data set 338 by: forming a first group 328 of geolocation transmissions 318 from journey traces 310 having a common starting location 312 and a common destination location 314; depending on accuracy values 324 for geolocation transmissions 318 within the first group 328, determining the weighted shortest path from the common starting location 312 to the common destination location 314 or generating a density-based extracted trace from the common starting location to the common destination location; and defining the journey trace data set 338 using either the weighted shortest path or the density-based extracted trace Referring again to FIG. 6, at step 608, communications server apparatus 102 reads the accuracy values 324 from the geolocation transmissions 318 in first group 328. Depending on the quality of the accuracy values, datasets defining the journey traces 310 may be generated in one of two ways. Thus, at step 610, communications server apparatus 102 applies a thresholding step to determine whether the accuracy values of the geolocation transmissions 318 are of a high quality or of a low quality. For instance, if the accuracy values are equal to or above, say, a median value, or a 75-quantile value, or a value on a pre-defined scale for measuring the accuracy value (e.g. 50, on a scale of 1 to 100), then the accuracy values are deemed to be of highquality. Conversely, if the accuracy values are below the designated threshold value, then they are deemed to be of low-quality and passed for processing in the second branch of the algorithm as illustrated on the right-hand side of FIG. 6, and as will be described below.

Figure 3D:
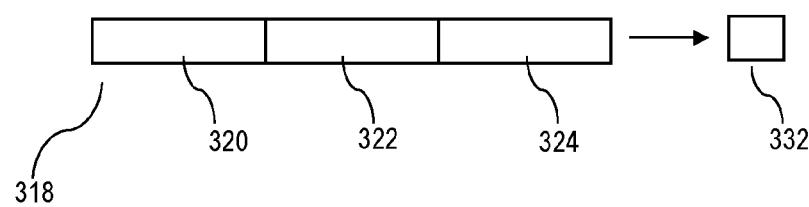
Figure 6:
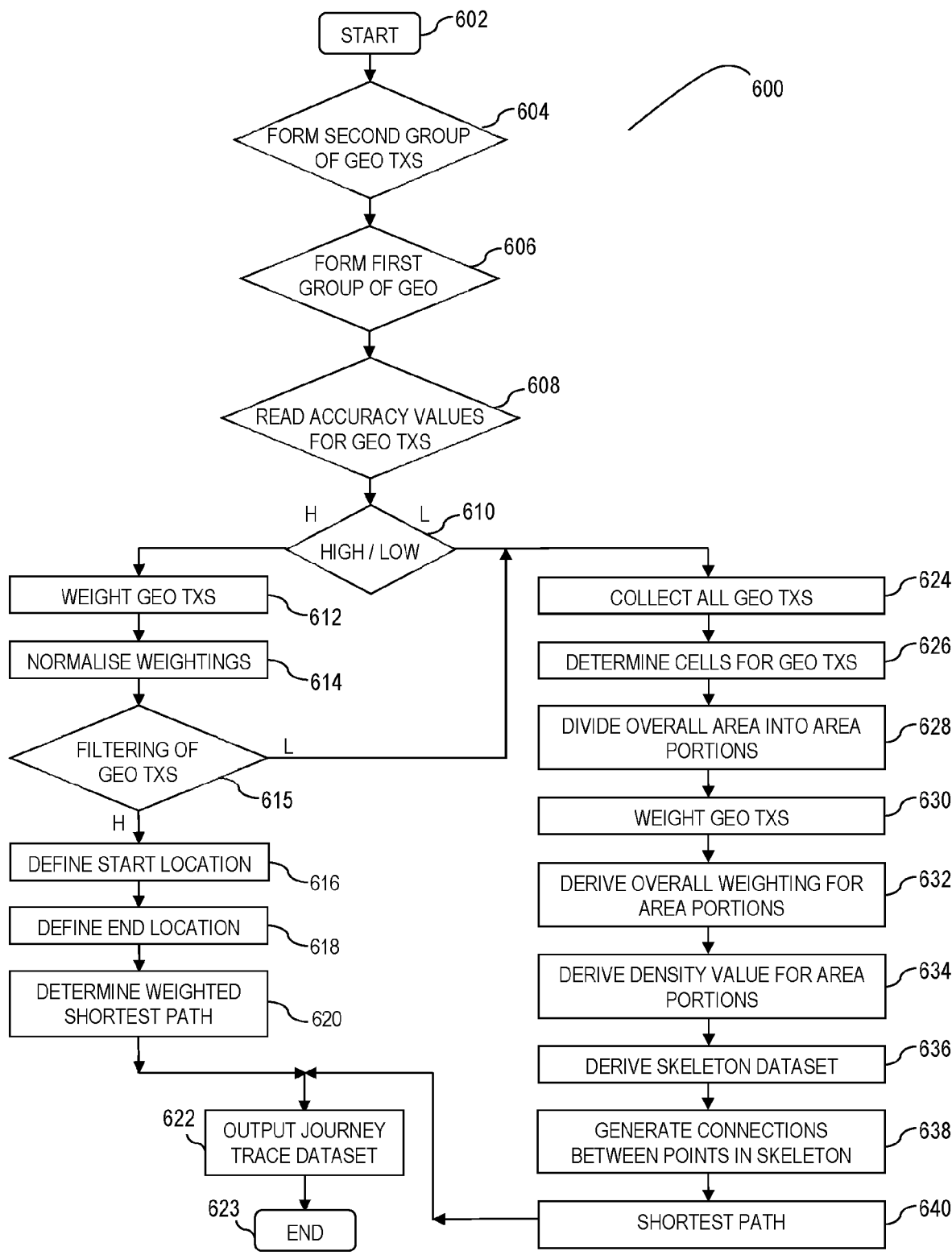
FIG. 6 is a flow diagram illustrating the techniques of FIGS. 3 and 4 in generating journey trace data sets.

For geolocation transmissions 318 with sufficiently high accuracy values 324—i.e., above the thresholding value which is determined and applied at step 610—communications server apparatus 102 determines, at step 612 of FIG. 6, weighting values 332 for the geolocation transmissions 318, as depicted at FIG. 3d, with those geolocation transmissions having higher accuracy values 324, being accorded higher weighting values 332. In one implementation, communications server apparatus 102 calculates weighting values at step 612 for geolocation transmissions from the same user journey 310.

Figure 3E:
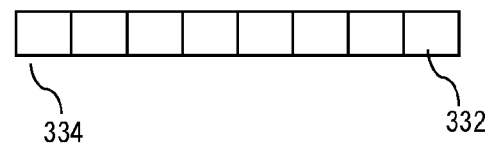

Optionally, communications server apparatus 102 normalises the weighting values 332 to facilitate easy processing of the weighting values 332, at optional step 614 of FIG. 6. A dataset 334 of weighting values 332 is created by communications server apparatus 102, as depicted in FIG. 3e.

These may be normalised weighting values, if normalisation is conducted at step 614.

It will be appreciated that the checking of the accuracy values of the geolocation transmissions, and filtering of them into high- and low-quality geolocation transmissions, and the subsequent weighting calculations are an optional series of steps. That is, communications server apparatus may proceed directly to step 615, now described, after execution of step 606 as described above.

At step 615, sorting of the geolocation transmissions 318 is conducted by communications server apparatus 102 basically to determine whether geolocation transmissions 318 (or parameters relating thereto) satisfy one or more thresholding criteria this will constitute further sort of geolocation transmissions, if the optional steps of checking and weighting of the accuracy values is undertaken, as described above. Two examples of such filtering now follow:

In a first technique, communications server apparatus 102 processes, at step 615, the geolocation transmissions 318 in the first group 328 to determine whether there are a minimum number of geolocation transmissions in a set, such as first group 328, for example when the first group 328 defines a set of geolocation transmissions from a user in a single journey, as described above. Thresholding is then applied and, in one example of this thresholding, the minimum number of geolocation transmissions 318 which are required is 10, but the value may depend on factors such as the overall sampling frequency and the application area size. A preferred range of numbers of geolocation transmissions to satisfy the threshold criterion is between 10 and 30.

That is, communications server apparatus 102 is configured to filter geolocation transmissions 318 if a number of geolocation transmissions in the first group 328 is less than a predefined minimum number.

In a second technique, which may be provided separately or in combination with the first technique, communications server apparatus 102 processes, at step 615, the geolocation transmissions 318 in the first group 328 to determine whether the geolocation transmissions 318 are sufficiently evenly distributed, meaning that the distances between two neighbouring transmissions 318 are similar across a whole trip. Thus, the spacing between neighbouring transmissions 318 is determined and thresholding is applied by communications server apparatus 102 to determine whether the spacing between the geolocation transmissions 308 is sufficiently uniform by using a function whereby, for a trip with an overall straight-line distance between the start location and the destination location, each pair of neighbouring geolocation transmissions should be spaced apart by no more than half of the overall straight-line distance.

That is, communications server apparatus 102 is configured to filter geolocation transmissions 318 spatial distribution of geolocation transmissions in the first group of geolocation transmissions satisfies a threshold criterion.

Any geolocation transmissions 318 found not to satisfy the threshold criterion/criteria are considered to be "low-quality" and then passed for processing in the second branch of the algorithm as illustrated on the right-hand side of FIG. 6, and as will be described below.

At step 616, communications server apparatus 102 denotes the starting point of the journey trace as being the centre point of the cell 302 from which the user journey commenced, and this may be regardless of which specific point in that geographical cell 302 the journey from which the geolocation transmissions 318 have been taken.

At step 618, communications seven apparatus 102 denotes the journey endpoint as being the specific destination location which, if it is recalled, is the pickup/rendezvous point with the driver in this example.

At step 620, communications server apparatus 102 applies a weighted shortest path technique, as is known, in order to define the journey trace based on the locations 316 from which the geolocation transmissions 318 have been transmitted. At step 622, communications server apparatus 102 uses this weighted shortest path to define nodes 336 and connections 337 (illustrated in FIG. 5) therebetween and to output the journey trace dataset 338a, depicted in FIG. 3f the corresponding data values for the nodes and connections for the user journey 310 of FIG. 3a. The process for generating journey trace data sets ends at step 623. In one implementation, the nodes 336 are defined as location data using, say, latitude and longitude values, converted from the image data, with the connections 337 being defined on the basis of connecting two nodes.

Therefore, communications server apparatus 102 is configured to determine the weighted shortest path by deriving weightings 332 for geolocation transmissions 318 in the first group 328 using the accuracy values 324; defining the common starting location 312 as a geographical cell 302; and forming an overall group 334 of weighted geolocation transmissions from plural user journeys starting in the geographical cell. Further, communications server apparatus 102 may be configured to determine the weighted shortest path by: identifying a centre of the geographical cell 302; and defining the weighted shortest path between the centre of the geographical cell and the common destination location 314 using the overall group 326 of weighted geolocation transmissions.

Figure 3F:
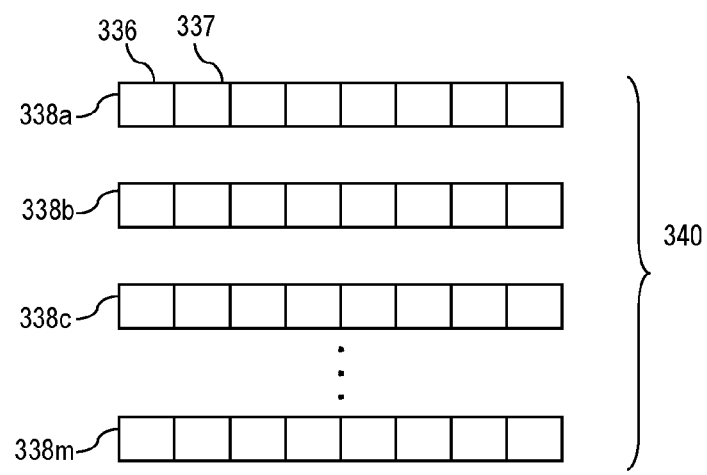

As noted above, multiple user journeys may have been undertaken in the area 300 and communications server apparatus 102 is configured to generate plural journey trace datasets 338a, 338b, 338c . . . 338m, as shown in FIG. 3f, thereby to generate a series 340 of journey trace datasets 338.

Figure 4A:
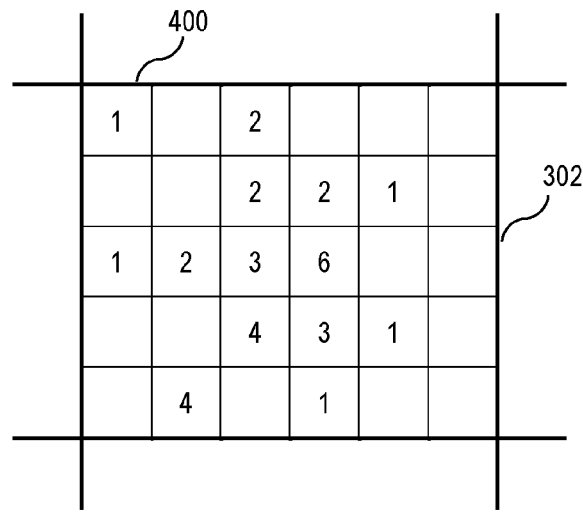
FIGS. 4A, 4B, 4C, 4D and 4E are a series of schematic diagrams illustrating another technique used by the communications server apparatus of FIG. 1 in generating journey trace data sets.

Coming back to step 610, if communications server apparatus 102 determines that the accuracy values 324 for the geolocation transmissions 318 are not above the threshold value, an alternative set of steps (a separate algorithm branch) is taken in order to generate the journey trace dataset. At step 624, communications server apparatus 102 groups all of the lower-accuracy geolocation transmissions 318. At step 626, communications server apparatus 102 determines the geographical cells 302 which cover the area from which he geolocation transmissions 318 were transmitted. For instance, this determination may be that the entire set 300 of geographical cells from FIG. 3a is the set of geographical cells, or it may be a subset of this group of geographical cells from which all the geolocation transmissions 318 were transmitted. At step 628, communications server apparatus 102 divides geographical cells 302 into area portions 400, as illustrated in FIG. 4a. In one exemplary implementation, the size of the area portions 400 is 2 m×2 m, a typical pathway width at, say, outdoor attractions.

Figure 4B:
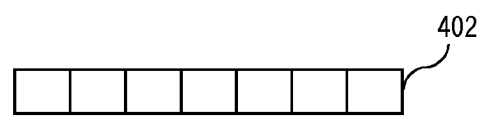
Figure 4C:
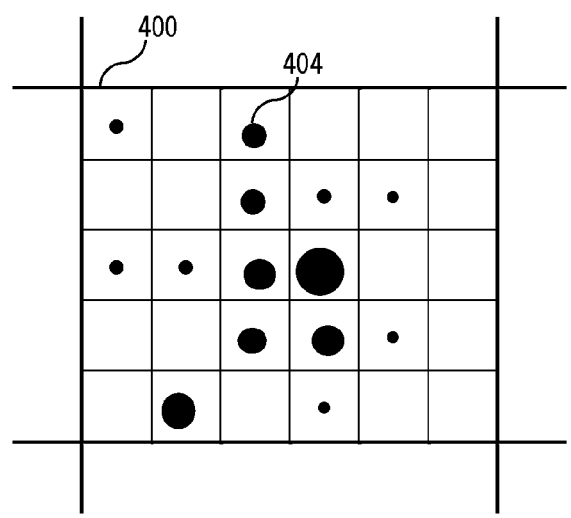

At step 630, communications server apparatus 102 applies weighting values for each of the geolocation transmissions 318, in a similar fashion to step 612 as described above, based on the accuracy values 324 of the geolocation transmissions 318. At step 632, communications server apparatus determines the number of geolocation transmissions 318 that have been transmitted from each of the area portions 400, based on the latitude and longitude values 320, 322 from the geolocation transmissions 318. This is depicted in FIG. 4*a*, from the digit counts shown in each of the area portions 400. At step 632, communications server apparatus 102 derives an overall weighting value for the area portions 400, and arranges these into a dataset 402 of overall weighting values for the area portions, as depicted in FIG. 4*b*. In one exemplary implementation, the overall weighting values 402 are derived by summing the individual weighting values derived at step 632, as described above. The overall weighting values 404 are depicted conceptually in FIG. 4*c* as the dots within each of the area portions 400, with the value of the weightings illustrated conceptually according to the sizing of the dots; that is, larger-sized dots represent higher weighting values than smaller-sized dots.

Figure 4D:
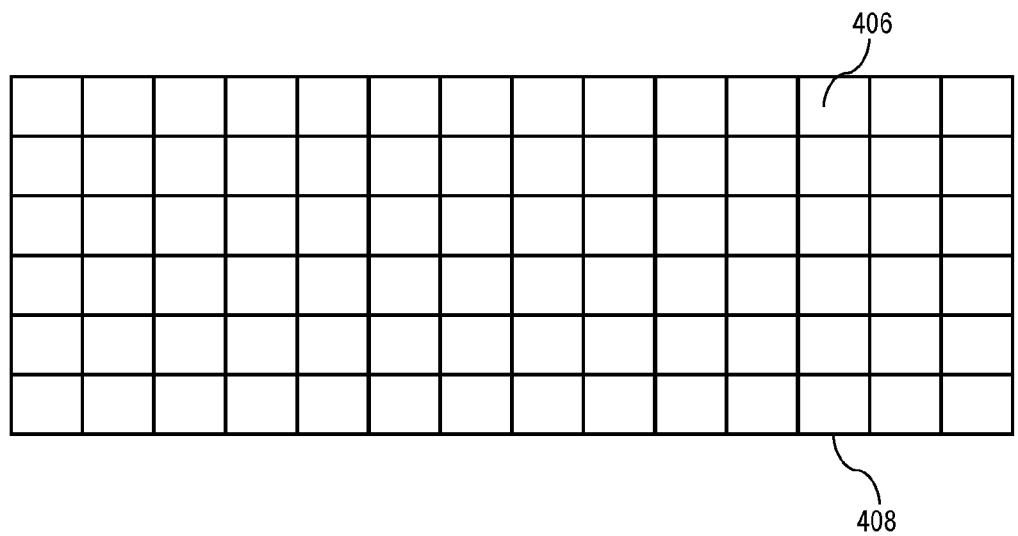
Figure 4E:
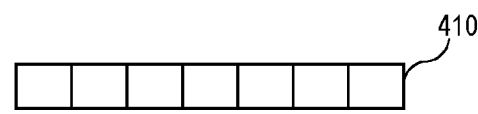
Figure 5:
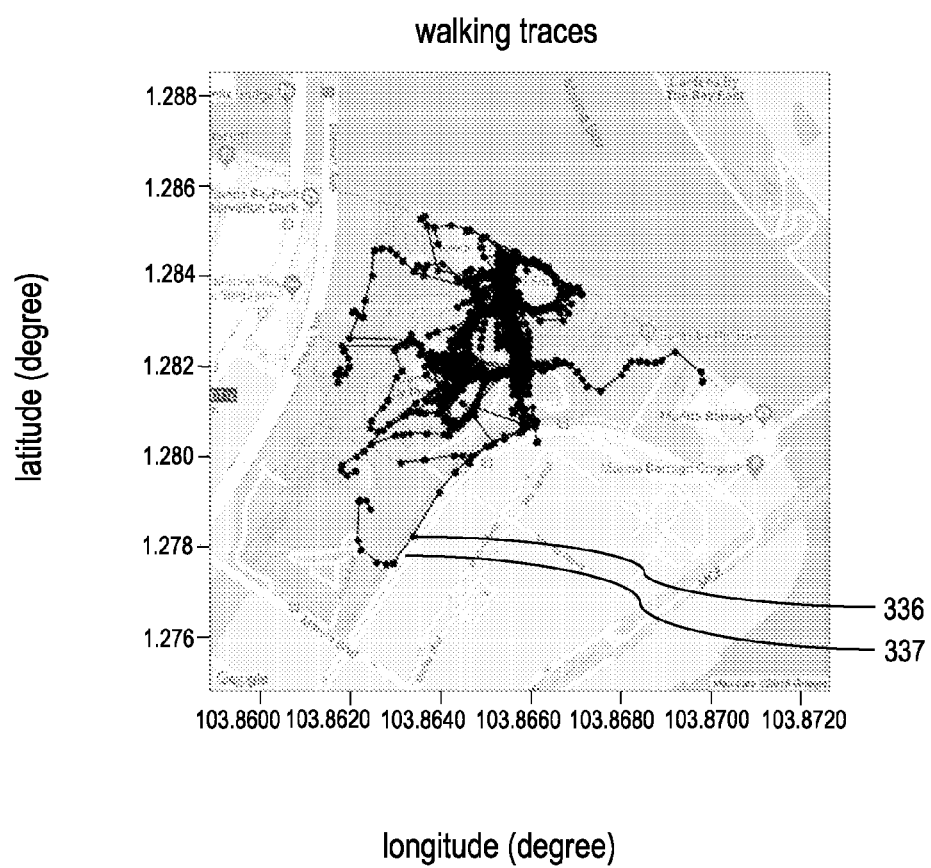
FIG. 5 is a screenshot illustrating journey trace data sets generated by the communications server apparatus of FIG. 1 rendered in image form.

At step 634, communications server apparatus 102 derives a density value 406 for each area portion 400, with the set 408 of density values 406 being for each area portion within each cell 302 of the group of geographical cells 300, depicted in FIG. 4*d*. The density dataset may, for example, define an image dataset; that is, the density values are generated in a format which makes the data suitable for rendering as an image. Thus, in such a situation, the density value may correspond to a pixel value, for a pixel in the image to be rendered, with the density value defining, for example, a brightness of the pixel. At step 636, communications server apparatus 102 applies a skeleton extraction technique from the density dataset 408, thereby to derive skeleton dataset 410, as depicted in FIG. 4*e*. The values in the skeleton dataset 410 may define, for example, the nodes 336 from FIG. 5. In effect, the nodes 336 correspond to "merged" geolocation transmission points, since these are derived using the data from multiple geolocation transmissions 318 at points 316 as described above. Then, at step 638, communications server apparatus 102 generates connections 337 between the nodes 336, generating data in the dataset defining the connections. with the result being the shortest path definition at step 640 from the starting location 312 to the destination location 314, defining the journey trace datasets 338, from FIG. 3*f*. The journey trace dataset generated at step 622 may be generated only for the high-accuracy geolocation transmissions 318 using the algorithm implemented by steps 612-620 as described above, only for the low-accuracy geolocation transmissions 318 using the algorithm branch implemented by steps 624-638, or when communications server apparatus 102 is processing a mixture of high-accuracy and low-accuracy geolocation transmissions 318, the journey trace dataset output at step 622 may be a combination of the shortest paths determined at steps 620 and 640 respectively.

With the second algorithm branch (starting at step 624) this, in effect, collects geolocation transmissions from multiple trips together, generating a kernel density function over the underlying area and extract trace data from the density image dataset using weighted shortest path.

Thus it will be appreciated that communications server apparatus 102 is configured to determine the density-based extracted trace by determining a group 300 of geographical cells 302 within which the geolocation transmissions 318 of an overall group 326 of geolocation transmissions 318 were transmitted from; generating a density image data set 408 for the overall group 326 of geolocation transmissions 318; deriving a skeleton data set 410 of merged geolocation transmission points from the density image data set 408; generating connections between merged geolocation transmission points 336 in the skeleton data set; defining a centre of a geographical cell as a starting location 312; and determining a shortest path of geolocation transmission points between the starting location 312 and the common destination location 314, the shortest path defining the density-based extracted trace. Communications server apparatus 104 may generate the density image dataset 408 by dividing the group 300 of geographical cells 302 into area portions 400; deriving weightings for geolocation transmissions 318 in the overall group 236 using accuracy values 324 of the geolocation transmissions 318 in the overall group 326; determining an overall weighting value 402 for geolocation transmissions 318 generated from within an area portion 400; and determining a corresponding density value 406 for the area portion 400 using the overall weighting value 402.

Thus, it will also be appreciated that—using either algorithm branch after step 610 of FIG. 6—communications server apparatus 102 is configured to generate a series 340 of journey trace datasets 338, each journey trace dataset 338 comprising data representing a user journey 310, each journey trace dataset 338 being derived using geolocation transmissions 318 from a communications device 104, 106 of a user 308 undertaking the user journey 310.

In the next step, with the series 340 of journey trace datasets 338, communications server apparatus 102 generates route image data comprising data representing a network of navigable routes. The journey trace datasets are derived from geolocation transmissions based on different user trajectories, even from the same starting and destination locations; journey traces between the same locations may overlap partially or fully with one another. They may deviate from one another, even slightly, due to differences in geolocation measurements/transmissions or by slight deviations in the actual routes traversed by the different users, or even from the same user undertaking the same journey more than once, but with slight variations. Thus, in the next step, the journey trace datasets are aggregated/merged so that redundant routes are minimised, deriving information relating to more commonly-used routes as well.

Figure 7A:
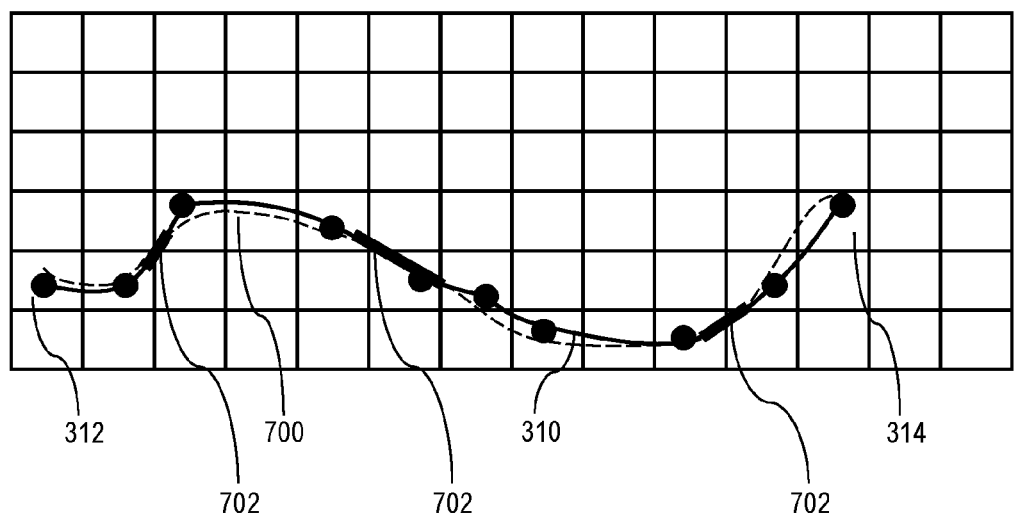
FIGS. 7A and 7B are a series of schematic diagrams illustrating one technique used by the communications server apparatus of FIG. 1 in generating route image data comprising data representing a network of navigable routes.
Figure 7B:
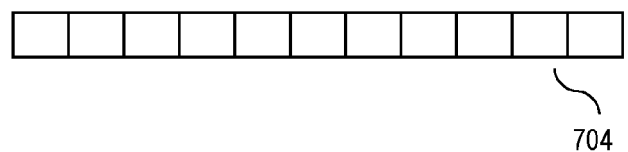
Figure 8:
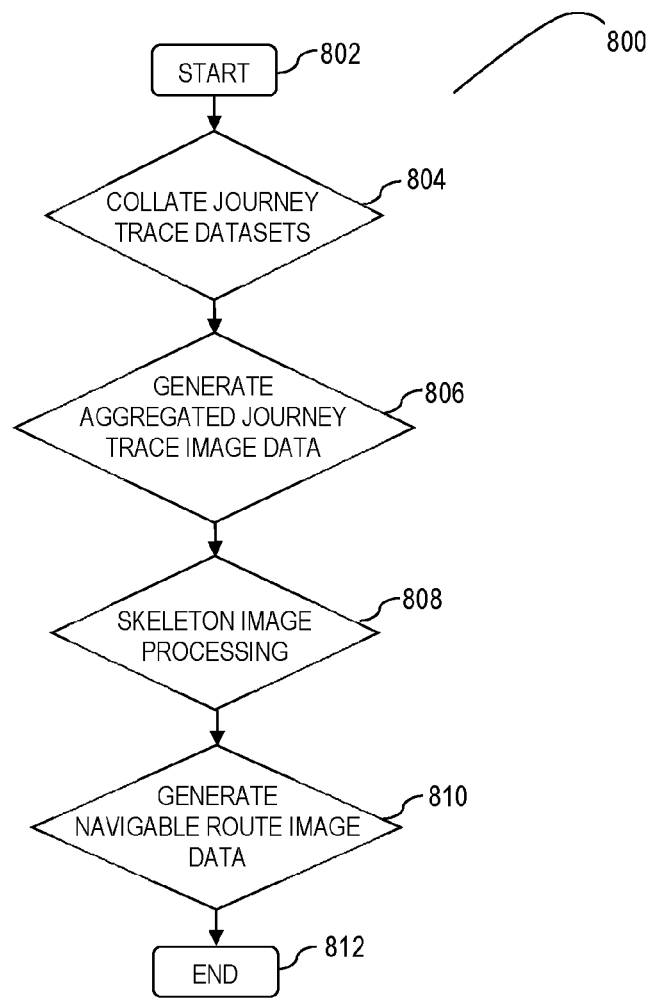
FIG. 8 is a flow diagram illustrating the techniques described with reference to FIG. 7 in generating route image data.

FIGS. 7 and 8 may be viewed in conjunction with one another. In FIG. 7, user journey 310 as illustrated in FIG. 3*a* is here again represented, this time being a representation of the journey trace dataset 338 which defines the journey 310, with FIG. 7 representing a rendering in image form of journey trace data.

Communications server apparatus 102 superimposes the series 340 of journey trace datasets 338, effectively merging the different user journeys into a single dataset, or at least datasets for individual user journey traces which can be correlated with one another. One way of doing this is for communications server apparatus 102 to render all journey trace datasets as image data, data either rendered as an image or capable of being so rendered.

In FIG. 7, a second user journey is represented by dashed line 700. User journey 700 is near identical to user journey 310, but subject to some deviation attributable either to errors in the geolocation measurements and/or slight deviations in the precise path traversed by the user undertaking journey 700. Sections 702 of the user journey traces illustrate where these traces overlap with one another or are sufficiently close to one another so that the journey traces in the sections are effectively identical. This is indicated by the heavier weight of the lines in these sections. Thus, the aggregation/merging of the journey trace datasets allows representation of journey trace density, with lines of heavier density indicating more frequently travelled routes. The example of FIG. 7 illustrates the principle using only two user journeys 310, 700 starting from or near the same starting location 312 and finishing at or near the same destination location 314. It will be appreciated that there may be other user journeys between the same starting and destination locations 312, 314 which follow a similar route between these locations but that other routes may also be followed between these starting and destination locations. It will also be appreciated that there will be other user journeys between different starting and destination locations, other user journeys starting from or near the same starting location 312 but finishing at a different destination location, and other user journeys starting from a different starting location, but finishing at or near the destination location 314. These, however, are omitted from FIG. 7 for the sake of clarity. However, if any of the sections of these additional journey traces overlap with sections of user journeys 310, 700, these overlap sections may be represented in a similar fashion by increasing the weights of the lines in the overlapping sections.

The route image data 704 thus generated is depicted schematically in FIG. 7b. So, communications server apparatus 102 is configured to aggregate the series 340 of journey trace datasets 338 by generating aggregated journey trace image data using journey trace data 338 for multiple journey traces 310, 700, the journey trace image data being representative of journey trace density. Further, the multiple journey trace datasets 338 may comprise data representative of user journeys from multiple geographical cells to a common destination location.

Of course, the journey trace density may be represented in other ways instead of according to the weights of the lines 310, 700 and/or the common sections 702; for instance, this could be done using different colours or in another suitable fashion in order to represent variations in journey trace density (i.e. the more frequently travelled routes or route sections).

Figure 9:
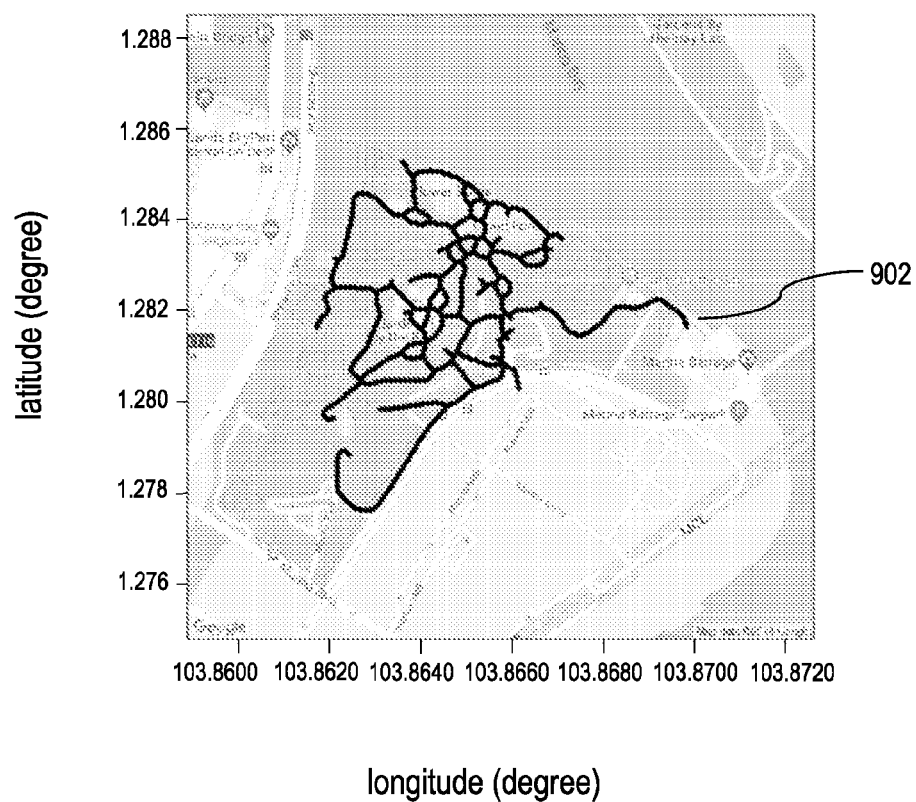
FIG. 9 is a screenshot illustrating route image data derived using the techniques described herein.

Thus, the process 800, after starting at 802, collates all journey trace datasets, at step 804, effectively aggregating the series of journey trace datasets. The aggregated journey trace datasets are used to generate aggregated journey trace image data at step 806, by aggregating the individual journey trace datasets 338 as described above. These individual journey trace datasets may define traces which overlap partially or fully between common destination and starting locations, with or without the deviations mentioned above. Communications server apparatus 102 generates the aggregated journey trace datasets as image data—i.e., data suitable for rendering as an image—such as a greyscale image with pixel brightness values corresponding to trace density. That is, the more frequently-travelled routes are represented in thicker and/or darker lines (or at least the image data is capable of being rendered thus). At step 808, communications server apparatus 102 applies one or more (known) skeleton extraction techniques with, optionally, further image processing techniques such as blurring and greyclosing. At step 810, communications server apparatus 102 generates the resulting skeleton illustrated in FIG. 9 which provides a clean representation of the navigable routes from each of the geographical cells 302 to one or more destination locations.

As noted above, the navigable route data from FIG. 9 is image data and is thus incapable of being used directly in navigation. Therefore, communications server apparatus 102 converts the route image data into navigable map data with proper road and node representation. Thus, communications server apparatus 102 generates a navigable map data by correlating the data representing sections of routes in the network of navigable routes with geolocations and/or with known thoroughfares.

Figure 10:
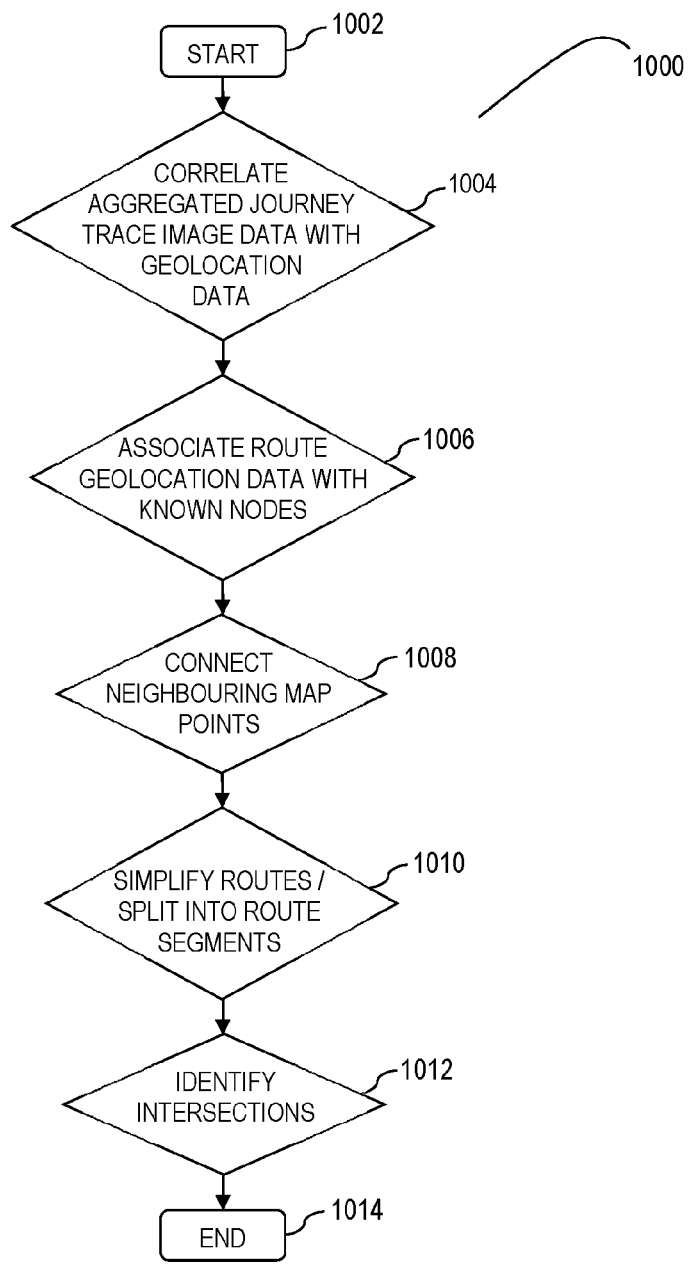
FIG. 10 is a flow diagram illustrating the techniques for generation of the navigable map data.

Referring to FIG. 10, a process 1000 for generating navigable map data is illustrated. Process 1000 starts at 1002 and that 1004, communications server apparatus 102 correlates the aggregated journey trace image data—for example as rendered in FIG. 9—with known geolocation data. This may be done by, for example, superimposing or otherwise correlating points in the route skeleton image data of FIG. 9 with the geolocations this represents. That is, for example, it is known from the pixel data for pixel 902 in FIG. 9 that this is part of the route image data representing part of the network of navigable routes and that the network of navigable routes is superimposed over map data, each map data point defining a geolocation by, for example, latitude and longitude values. As such, communications server apparatus 102 associates/correlates that pixel 902 with the underlying geolocation. Likewise, since communications server apparatus 102 has access to this map data, it is able to associate the route geolocation data with known nodes, known landmarks in the geographical area, with this step being completed at 1006.

Communications server apparatus 102 repeats this process for each pixel in the route image data, and associates geolocations corresponding to pixels which are adjacent to one another in the image data at step 1008. As such, the geolocations associated with/underlying the pixel points are associated with one another as being part of the navigable route, that is possible to travel from one geolocation to another, with those geolocations being represented by pixel points in the route image data.

At step 1010, communications server apparatus 102 simplifies each route or segment thereof such that a straight line in the connected geolocation data can be represented efficiently by only two end nodes, the nodes representing the end locations in a segment of the navigable route. One suitable technique for this step is to implement Ramer-Douglas-Peucker algorithm processing. Finally, at step 1012, communications server apparatus 102 identifies any intersections in the navigable map data denoting these as intersection nodes.

Figure 11:
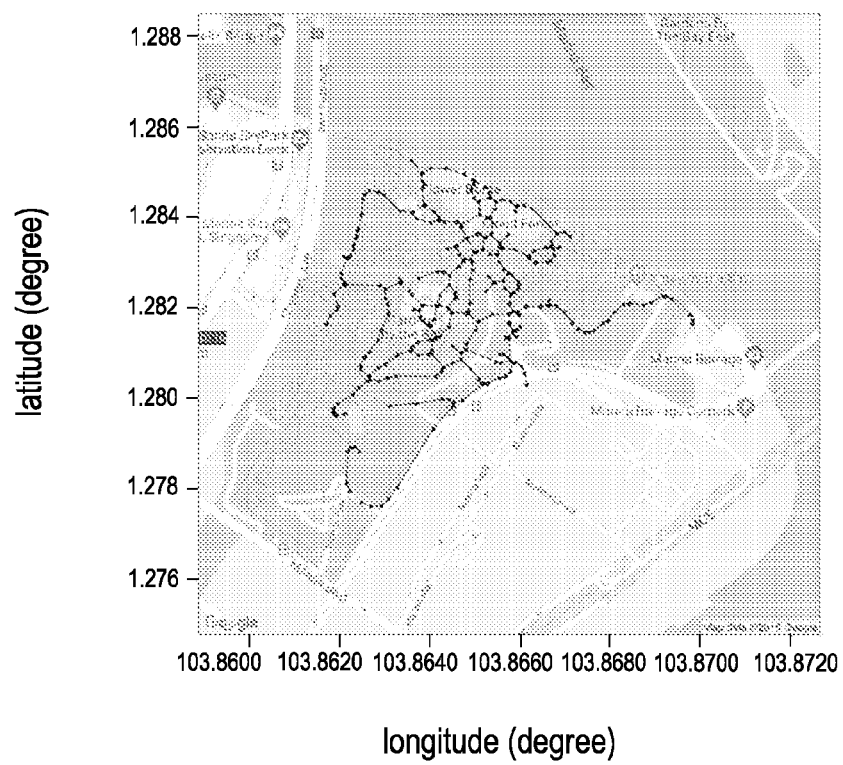
FIG. 11 is a screenshot illustrating navigable map data generated according to the techniques described herein.

The process ends at 1014, after which communications server apparatus 102 has generated, from the route image data (from step 810) the navigable map data, the navigable map data comprising data representing a series of geolocations corresponding to the network of navigable routes, as depicted in FIG. 11.

Figure 12:
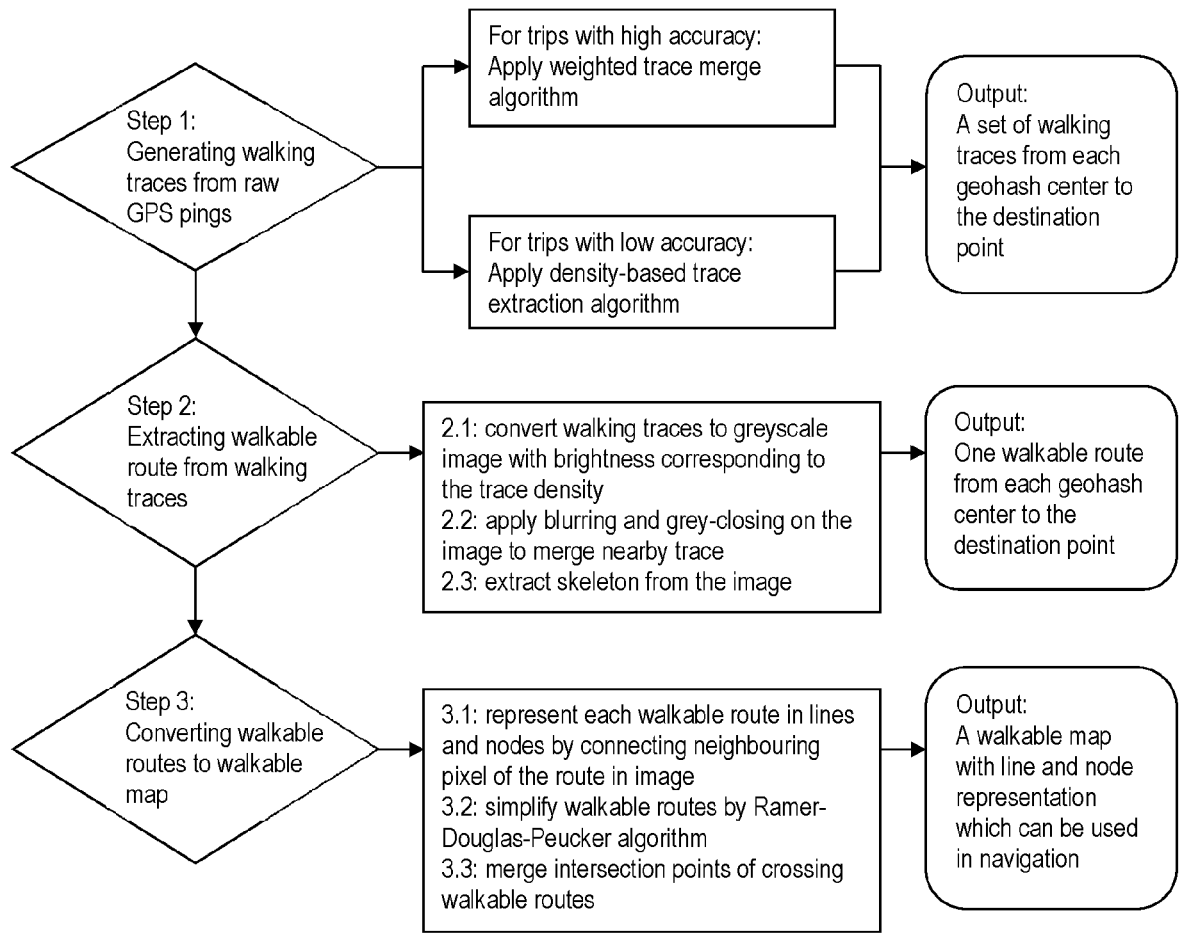
FIG. 12 is a block diagram illustrating an overview of the techniques described with reference to FIGS. 1-11.

FIG. 12 presents an overview of the techniques described above, in the context of the navigable map data being for use by pedestrians as walkable maps.

Thus, the techniques presented above are particularly useful, especially in the generation of navigable walking maps for pedestrian use. Pedestrian travellers tend to cover short distances by walking, and the traces representing their journeys cover a smaller area compared to those of vehicles. In order to infer a pedestrian walkable map for a given area, geolocation transmissions from all user journeys available in whole area are grouped by their respective destination. The application scenarios are widely found in ride-hailing and navigation where users have their destination points specified in advance. Each group of geolocation transmissions can be processed following the three-step framework described below, thereby to generate a walkable map specific to area surrounding the users' journeys. The complete walkable map of the area can be obtained by merging separate walkable maps.

It will be appreciated that the invention has been described by way of example only. Various modifications may be made to the techniques described herein without departing from the spirit and scope of the appended claims. The disclosed techniques comprise techniques which may be provided in a stand-alone manner, or in combination with one another. Therefore, features described with respect to one technique may also be presented in combination with another technique.

REFERENCES

1. S. Edelkamp and S. Schrödl. Route planning and map inference with global positioning traces. In Computer Science in Perspective, pages 128-151, 2003.
2. S. Schrödl, K. Wagstaff, S. Rogers, P. Langley, and C. Wilson. Mining GPS traces for map refinement. Data Min. Knowl. Discov., 9 (1):59-87, 2004.
3. S. Worrall and E. Nebot. Automated process for generating digitised maps through GPS data compression. In Australasian Conference on Robotics and Automation, 2007.
4. G. Agamennoni, J. I. Nieto, and E. M. Nebot. Robust inference of principal road paths for intelligent transportation systems. IEEE Trans. on Intelligent Transportation Systems, 12 (1):298-308, 2011.
5. L. Cao and J. Krumm. From GPS traces to a routable road map. In ACM SIGSPATIAL GIS, 2009.
6. B. Niehoefer, R. Burda, C. Wietfeld, F. Bauer, and O. Lueert. GPS community map generation for enhanced routing methods based on trace-collection by mobile phones. In 1st Int'l Conf. on Advances in Satellite and Space Communications, 2009.
7. L. Zhang, F. Thiemann, and M. Sester. Integration of GPS traces with road map. In 2nd Int'l Workshop on Computational Transportation Science, 2010.
8. J. J. Davies, A. R. Beresford, and A. Hopper. Scalable, distributed, real-time map generation. IEEE Pervasive Computing, 5 (4):47-54, 2006.
9. A. Steiner and A. Leonhardt. A map generation algorithm using low frequency vehicle position data. In Transportation Research Board, 90th Annual, 2011.
10. W. Shi, S. Shen, and Y. Liu. Automatic generation of road network map from massive GPS, vehicle trajectories. In Intelligent Transportation Systems, International IEEE Conference on, 2009.
11. James Biagioni and Jakob Eriksson. Inferring Road Maps from Global Positioning System Traces Survey and Comparative Evaluation. 91st Annual Meeting of the Transportation Research Board, 2011.
12. Alireza Fathi and John Krumm. Detecting road intersections from GPS traces. In Proceedings of the 6th International Conference on Geographic Information Science. 56-69. 2010.
13. Radu Mariescu-Istodor and Pasi Fränti. CellNet: Inferring road networks from GPS trajectories. ACM Trans. Spatial Algorithms Syst. 4, 3, Article 8 (September 2018)
14. Piyawan Kasemsuppakorn and Hassan A. Karimi. A pedestrian network construction algorithm based on multiple GPS traces. Transportation Research Part C: Emerging Technologies 26, 285-300. 2013.
15. Blanke, Ulf and Guldener, Robin and Feese, Sebastian and Troster, Gerhard. Crowdsourced Pedestrian Map Construction for Short-term City-scale Events. In Proceedings of the First International Conference on IoT in Urban Space, 2014.
16. Borruso, Giuseppe and Schoier, Gabriella. Spatial Data Mining for Highlighting Hotspots in Personal Navigation Routes. Int. J. Data Warehous. Min. July 2012
17. Google patent, System and method for road map creation. U.S. Pat. No. 8,612,136B2, Date of Patent: Dec. 17, 2013.
18. Google patent, Updating road maps. Patent No: US 2014/0278055 A1, Date of Patent: Sep. 18, 2014.

The invention claimed is:

1. A communications server apparatus for generating navigable map data, the communications server apparatus comprising a processor and a memory, and being configured, under control of the processor, to execute instructions stored in the memory:
   to receive a plurality of noisy geolocation transmissions from communications devices of a plurality of users;
   to generate a series of journey trace data sets, each journey trace data set comprising data representing a user journey, each journey trace data set being derived using the plurality of noisy geolocation transmissions from at least a first communications device of at least a first user undertaking the user journey;
   to aggregate the series of journey trace data sets to generate route image data comprising data representing a network of navigable routes;
   to generate, from the route image data, the navigable map data, the navigable map data comprising data representing a series of geolocations corresponding to the network of navigable routes, wherein one or more of the series of journey trace data sets is generated by:
      forming a first group of geolocation transmissions from journey traces having a common starting location and a common destination location;
      if accuracy values for geolocation transmissions within the first group are above a threshold, determining a weighted shortest path from the common starting location to the common destination location, and if the accuracy values for geolocation transmissions within the first group are below the threshold, generating a density-based extracted trace from the common starting location to the common destination location; and
      defining the journey trace data set using the relevant one of the weighted shortest path and the density-based extracted trace; and
   to transmit the navigable map data comprising data representing the series of geolocations corresponding to the network of navigable routes to at least a first user device for use in navigation.

2. The communications server apparatus according to claim 1, configured for the first group of geolocation transmissions to be formed from a second group of geolocation transmissions from journey traces having the common destination location but different starting locations.

3. The communications server apparatus according to claim 1, configured to filter geolocation transmissions if a number of geolocation transmissions in the first group of geolocation transmissions is less than a predefined minimum number.

4. The communications server apparatus according to claim 1, configured to filter geolocation transmissions if spatial distribution of geolocation transmissions in the first group of geolocation transmissions satisfies a threshold criterion.

5. The communications server apparatus according to claim 1, configured to determine the weighted shortest path by:

deriving weightings for geolocation transmissions in the first group using the accuracy values;
defining the common starting location as a geographical cell; and
forming an overall group of weighted geolocation transmissions from plural user journeys starting in the geographical cell.

6. The communications server apparatus according to claim 5, configured to determine the weighted shortest path by:
identifying a centre of the geographical cell; and
defining the weighted shortest path between the centre of the geographical cell and the common destination location using the overall group of weighted geolocation transmissions.

7. The communications server apparatus according to claim 1, configured to determine the density-based extracted trace by:
determining a group of geographical cells within which the geolocation transmissions of an overall group of geolocation transmissions were transmitted from;
generating a density image data set for the overall group of geolocation transmissions;
deriving a skeleton data set of merged geolocation transmission points from the density image data set;
generating connections between merged geolocation transmission points in the skeleton data set;
defining a centre of a geographical cell as a starting location; and
determining a shortest path of geolocation transmission points between the starting location and the common destination location, the shortest path defining the density-based extracted trace.

8. The communications server apparatus according to claim 7, configured to generate the density image data set by:
dividing the group of geographical cells into area portions;
deriving weightings for geolocation transmissions in the overall group using accuracy values of the geolocation transmissions in the overall group;
determining an overall weighting value for geolocation transmissions generated from within an area portion; and
determining a corresponding density value for the area portion using the overall weighting value.

9. The communications server apparatus according to claim 1, configured to aggregate the series of journey trace data sets by generating aggregated journey trace image data using journey trace data for multiple journey traces, the journey trace image data being representative of journey trace density.

10. The communications server apparatus according to claim 9, wherein the multiple journey trace data sets comprise data representative of user journeys from multiple geographical cells to a common destination location.

11. The communications server apparatus according to claim 9, configured to perform skeleton extraction processing on the journey trace image data, thereby to derive the data representing the network of navigable routes.

12. The communications server apparatus according to claim 1, configured to generate the navigable map data by correlating the data representing sections of routes in the network of navigable routes with geolocations and/or with known thoroughfares.

13. The communications server apparatus according to claim 12, configured to associate the geolocations with one another thereby to generate the navigable map data.

14. The communications server apparatus according to claim 1, configured to transmit a communication based at least in part on the navigable map data, wherein the communication, when received, facilitates navigation based on the navigable map data.

15. A method, performed in a communications server apparatus for generating navigable map data, the method comprising, under control of a processor of the server apparatus:
receiving a plurality of noisy geolocation transmissions from communications devices of a plurality of users;
generating a series of journey trace data sets, each journey trace data set comprising data representing a user journey, each journey trace data set being derived using the plurality of noisy geolocation transmissions from at least a first communications device of at least a first user undertaking the user journey;
aggregating the series of journey trace data sets to generate route image data comprising data representing a network of navigable routes;
generating, from the route image data, the navigable map data, the navigable map data comprising data representing a series of geolocations corresponding to the network of navigable routes, wherein generating one or more of the journey trace data sets comprises:
forming a first group of geolocation transmissions from journey traces having a common starting location and a common destination location;
if accuracy values for geolocation transmissions within the first group are above a threshold, determining a weighted shortest path from the common starting location to the common destination location,
and if the accuracy values for geolocation transmissions within the first group are below the threshold, generating a density-based extracted trace from the common starting location to the common destination location; and
defining the journey trace data set using the relevant one of the weighted shortest path and the density-based extracted trace; and
transmitting the navigable map data comprising data representing the series of geolocations corresponding to the network of navigable routes to at least a first user device for use in navigation.

16. The method of claim 15, further comprising transmitting a communication based at least in part on the navigable map data, wherein the communication, when received, facilitates navigation based on the navigable map data.

17. A non-transitory storage medium storing instructions, which when executed by a processor of a communications server apparatus, cause the processor to perform a method for generating navigable map data, the method comprising:
receiving a plurality of noisy geolocations transmissions from communications devices of a plurality of users;
generating a series of journey trace data sets, each journey trace data set comprising data representing a user journey, each journey trace data set being derived using the plurality of noisy geolocation transmissions from at least a first communications device of at least a first user undertaking the user journey;
aggregating the series of journey trace data sets to generate route image data comprising data representing a network of navigable routes;

generating, from the route image data, the navigable map data, the navigable map data comprising data representing a series of geolocations corresponding to the network of navigable routes, wherein generating one or more of the journey trace data sets comprises:
   forming a first group of geolocation transmissions from journey traces having a common starting location and a common destination location;
   if accuracy values for geolocation transmissions within the first group are above a threshold, determining a weighted shortest path from the common starting location to the common destination location,
   and if the accuracy values for geolocation transmissions within the first group are below the threshold, generating a density-based extracted trace from the common starting location to the common destination location; and
   defining the journey trace data set using the relevant one of the weighted shortest path and the density-based extracted trace; and
transmitting the navigable map data comprising data representing the series of geolocations corresponding to the network of navigable routes to at least a first user device for use in navigation.

18. The non-transitory storage medium of claim 17, wherein the method further comprises transmitting a communication based at least in part on the navigable map data, wherein the communication, when received, facilitates navigation based on the navigable map data.

\* \* \* \* \*